No. 866,488. PATENTED SEPT. 17, 1907.
J. G. LAMBERT & B. E. WADDAMS.
VARIABLE SPEED GEARING.
APPLICATION FILED MAR. 9, 1907.

2 SHEETS—SHEET 1.

WITNESSES:
G. O. Lymes.
Edward L. George.

INVENTORS.
J. G. Lambert & B. E. Waddams.
Per Robert E. Phillips.
Attorney.

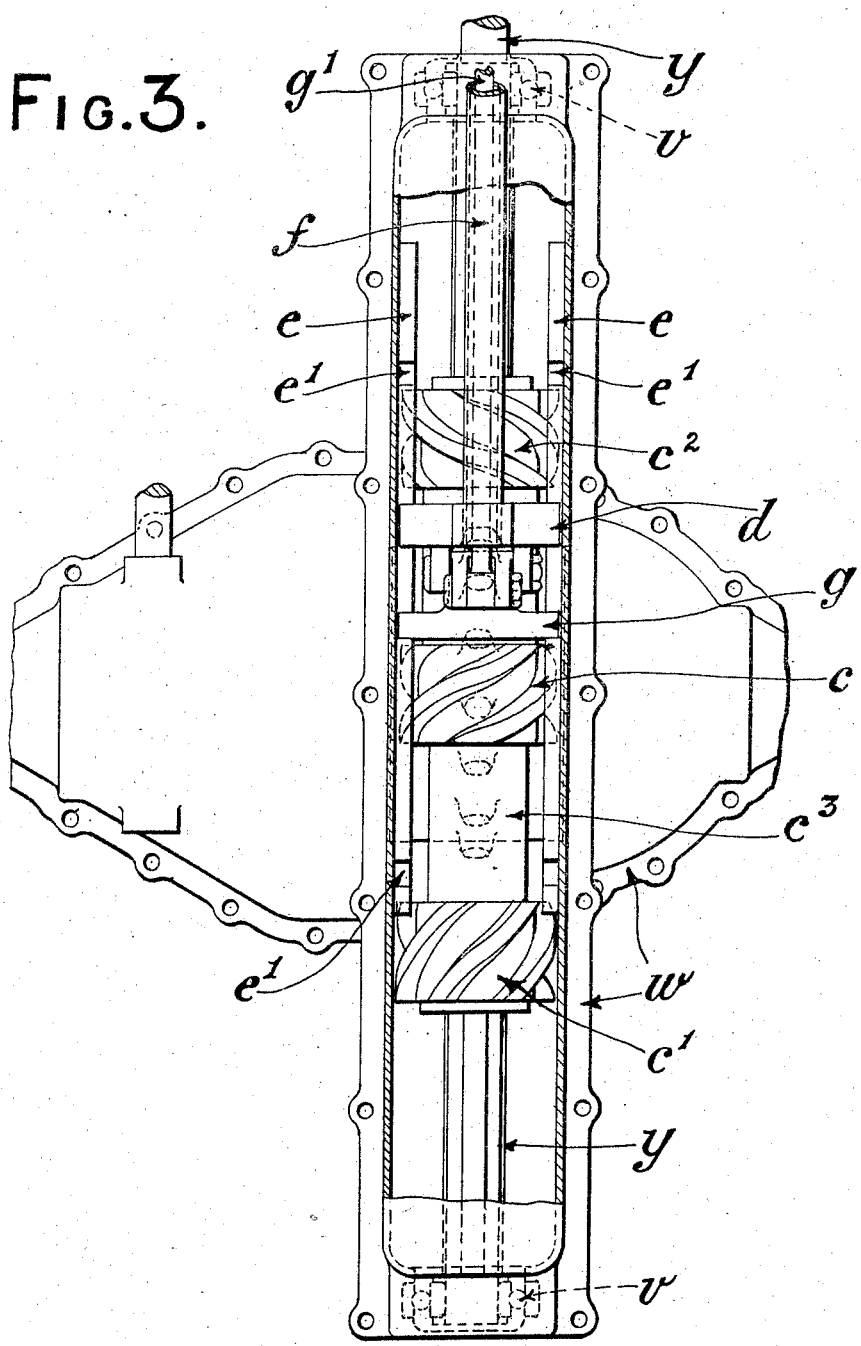

UNITED STATES PATENT OFFICE.

JAMES GRAHAM LAMBERT, OF HADLEIGH, AND BENJAMIN EDWARD WADDAMS, OF EALING, ENGLAND.

VARIABLE-SPEED GEARING.

No. 866,488.    Specification of Letters Patent.    Patented Sept. 17, 1907.

Application filed March 9, 1907. Serial No. 361,469.

*To all whom it may concern:*

Be it known that we, JAMES GRAHAM LAMBERT, a subject of the King of Great Britain and Ireland, and residing at Ivy Tree Farm, Hadleigh, in the county of Suffolk, England, automobile engineer, and BENJAMIN EDWARD WADDAMS, a subject of the King of Great Britain and Ireland, and residing at 4, St. James avenue, Ealing, in the county of Middlesex, England, engineer's draftsman, have invented new and useful Improvements in and relating to, Variable-Speed Gearing, of which the following is a specification.

This invention relates to variable speed gearing for motor road vehicles, and it consists essentially of a plurality of worms mounted to slide on but rotate with the propeller or driving shaft, the said worms being all of the same diameter but having the same normal pitch and a varying number of threads, a single worm wheel on the axle carrying or transmitting motion to the road wheels, a clutch for coupling said worm wheel to said shaft, and means for bringing the worms on the driving shaft into engagement with the worm wheel on the driven shaft, the objects being to obtain a direct drive on all speeds and generally to simplify and reduce the number of parts in such gearing.

Figure 1:
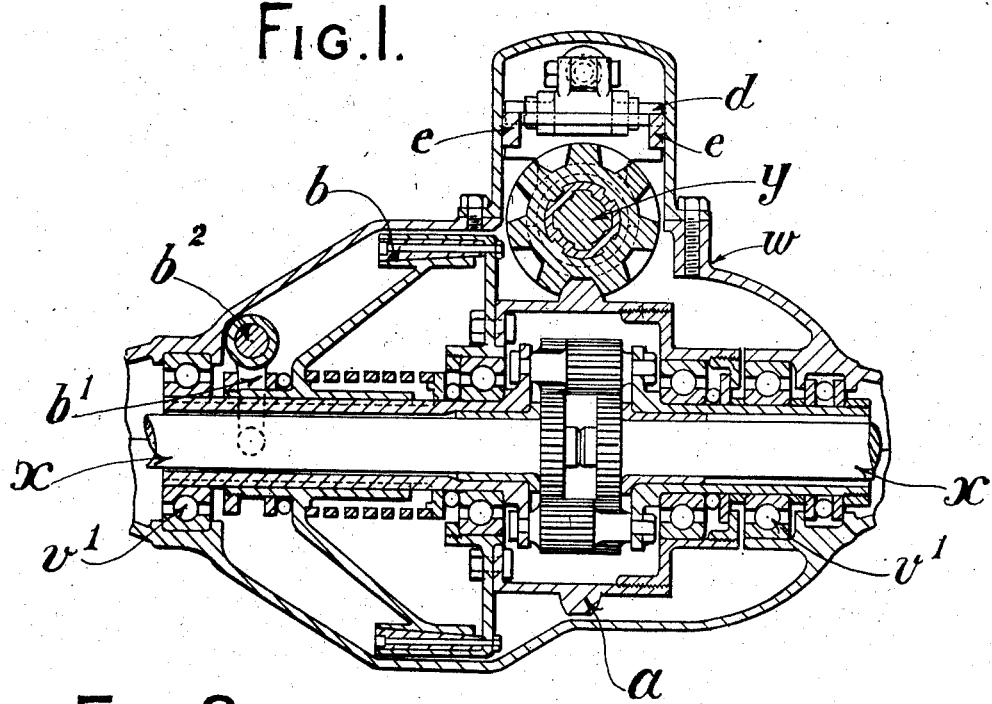
Figure 2:
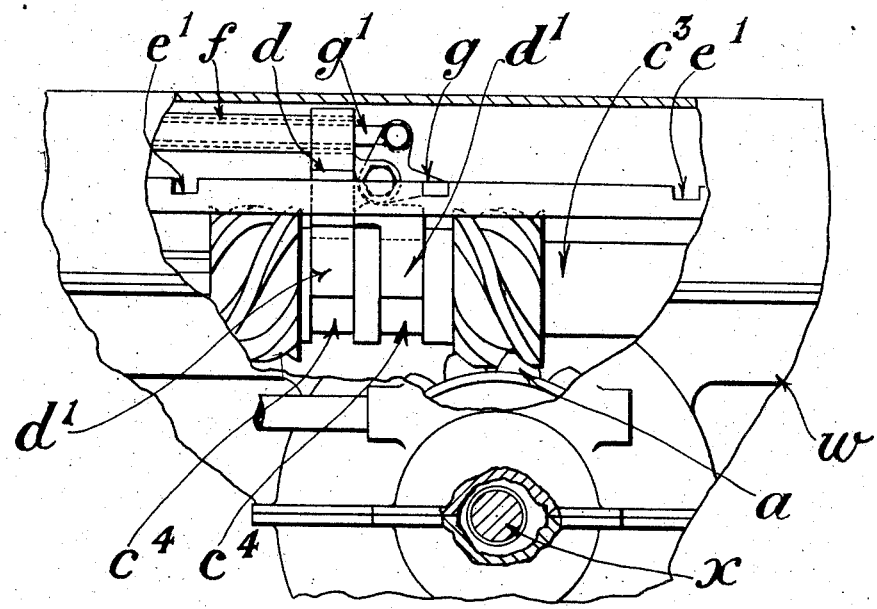

In the accompanying drawings which illustrate this invention:—Figure 1 is a broken view in transverse section through the center of the driven shaft, Fig. 2 is a broken view in side elevation, and Fig. 3 is a broken view in plan—partly in section.

Throughout the views similar parts are marked with like letters of reference.

On the driven shaft $x$ is loosely mounted a worm wheel $a$ which can be coupled or uncoupled with the said shaft (through the differential gear, which may be of any suitable type, and forms no part of this invention) by means of a clutch $b$ which may either be of the cone type, as illustrated, or of any other suitable and convenient type.

Arranged at right angles to the shaft $x$ is the driving shaft $y$ which is coupled either directly or indirectly to the motor. This shaft $y$ runs in suitable bearings $v\ v$ formed in or carried by the casing $w$ which carries the bearings $v^1\ v^1$ of the driven shaft $x$.

On the shaft $y$ are fixed at a suitable distance apart three worms $c\ c^1$ and $c^2$, all of the same diameter and normal pitch, but each having a varying number of threads. The worm $c$ has two threads and the worm $c^1$ seven threads, giving a velocity ratio of $3\frac{1}{2}$ to 1, the threads of both being either right-or left-handed according to the direction in which the engine revolves. The threads of the worms $c^2$ are oppositely arranged to those of the worms $c$ and $c^1$, so as to drive the shaft $x$ in the reverse direction.

It will be obvious that any number of velocity ratios may be provided by the employment of additional worms, and that the velocity ratios will depend upon the number of threads in each worm.

The worms are preferably formed on or fixed to a sleeve $c^3$ mounted to slide freely on the shaft $y$ but are constrained to rotate with said shaft, so that they can be controlled by a single lever, but this is not obligatory. The position of the sleeve $c^3$ with respect to the worm wheel $a$ is controlled and regulated by a fork $d^1$ carried by a slide $d$ mounted on suitable guides $e$ in the casing $w$, the said fork engaging grooves $c^4\ c^4$ in said sleeve. The said fork $d^1$ is preferably a duplex one as shown so as to operate as a thrust bearing to take the driving thrust of the worms.

The slide $d$ is operated by a rod $f$ connected with any suitable operating mechanism under the control of the driver, and to retain the said slide, and therefore the worms in their operative positions with respect to the worm wheel $a$, any suitable locking device may be employed. For instance, that shown in the accompanying drawing, which consists of a pawl $g$ pivoted to the slide $d$ and engaging notches $e^1$ in the guides $e$ in the casing $w$, the position of the pawl being controlled by any suitable mechanism such as a rod $g^1$ running through the rod $f$ which would be made hollow to receive it.

The teeth of the worm wheel $a$ are preferably circular in form and may take the form of rollers mounted on radially arranged pins.

The disengaging part of the clutch $b$ is connected through suitable mechanism, such as a fork $b^1$ mounted on a rocking shaft $b^2$ which is connected with a foot or other lever under the control of the driver of the vehicle, and if the usual friction clutch is employed to couple the crank-shaft of the motor with the driving shaft $y$ the two clutches are arranged to work in unison.

It will be seen that this gearing gives a direct drive on all speeds.

What we claim as our invention, and desire to secure by Letters Patent, is:—

1. In a variable speed gearing, the combination with the driving and driven shafts, of a worm wheel mounted loosely on the driven shaft, a clutch for coupling said wheel to said shaft, a plurality of worms of the same diameter and normal pitch but each having a different number of threads, the said worms being all mounted on a sleeve free to slide on but rotate with the driving shaft, means for shifting the position of the said sleeve on said shaft, means for locking said sleeve in the several positions to retain the worms in their operative positions, and means for disengaging the clutch, as set forth.

2. In a variable speed gearing for motor road vehicles, the combination of a driving shaft, a driven shaft of the differential type arranged at right angles to the driving shaft, a worm wheel loosely mounted on the driven shaft, a clutch for coupling the worm wheel to the primary or driving members of the differential gear, a plurality of worms mounted to rotate with and slide on the driving shaft the said worms being all of the same diameter and normal pitch but each having a different number of threads, means for bringing the said worms into engagement with the worm wheel, and means for locking the said worms to retain same in their operative positions, as set forth.

3. In a variable speed gearing for motor road vehicles, the combination of a driving shaft, a driven shaft of the differential type arranged at right angles to the driving shaft, a worm wheel loosely mounted on the driven shaft, a clutch for coupling the worm wheel to the primary or driving members of the differential gear, a plurality of worms of the same diameter and normal pitch but each having a different number of threads the said worms being all mounted on a sleeve free to slide on but rotate with the driving shaft, means for shifting the position of the said sleeve on said shaft, and of means for locking said sleeve in the several positions to retain the worms in their operative positions, as set forth.

4. In a variable speed gearing for motor road vehicles, the combination of a driving shaft, a driven shaft fitted with a differential gear, a worm wheel loosely mounted on the driven shaft, a clutch for coupling the worm wheel to the primary or driving members of the differential gear, a plurality of worms mounted to rotate with and slide on the driving shaft, the said worms being all of the same diameter and normal pitch but each having a different number of threads, means for bringing the said worms into engagement with the worm wheel, and means for locking said worms to retain same in their operative positions, as set forth.

5. In a variable speed gearing for motor road vehicles, the combination of a driving shaft, a driven shaft fitted with a differential gear, a worm wheel loosely mounted on the driven shaft, a clutch for coupling the worm wheel to the primary or driving members of the differential gear, a plurality of worms of the same diameter and normal pitch but each having a different number of threads, the said worms being all mounted on a sleeve free to slide on but rotate with the driving shaft, of means for shifting the position of the said sleeve on said shaft, of means for locking said sleeve in the several positions to retain the worms in their operative positions, and of means for disengaging the clutch, as set forth.

JAMES GRAHAM LAMBERT.
BENJAMIN EDWARD WADDAMS.

Witnesses:
G. V. SYMES,
H. D. JAMESON.